Feb. 15, 1955     F. F. DOUGLASS     2,702,092
DEVICE FOR GREASE PACKING ANTIFRICTION BEARINGS
Filed Jan. 5, 1953     2 Sheets-Sheet 1

FREDERICK F. DOUGLASS
INVENTOR
BY Smith & Tuck

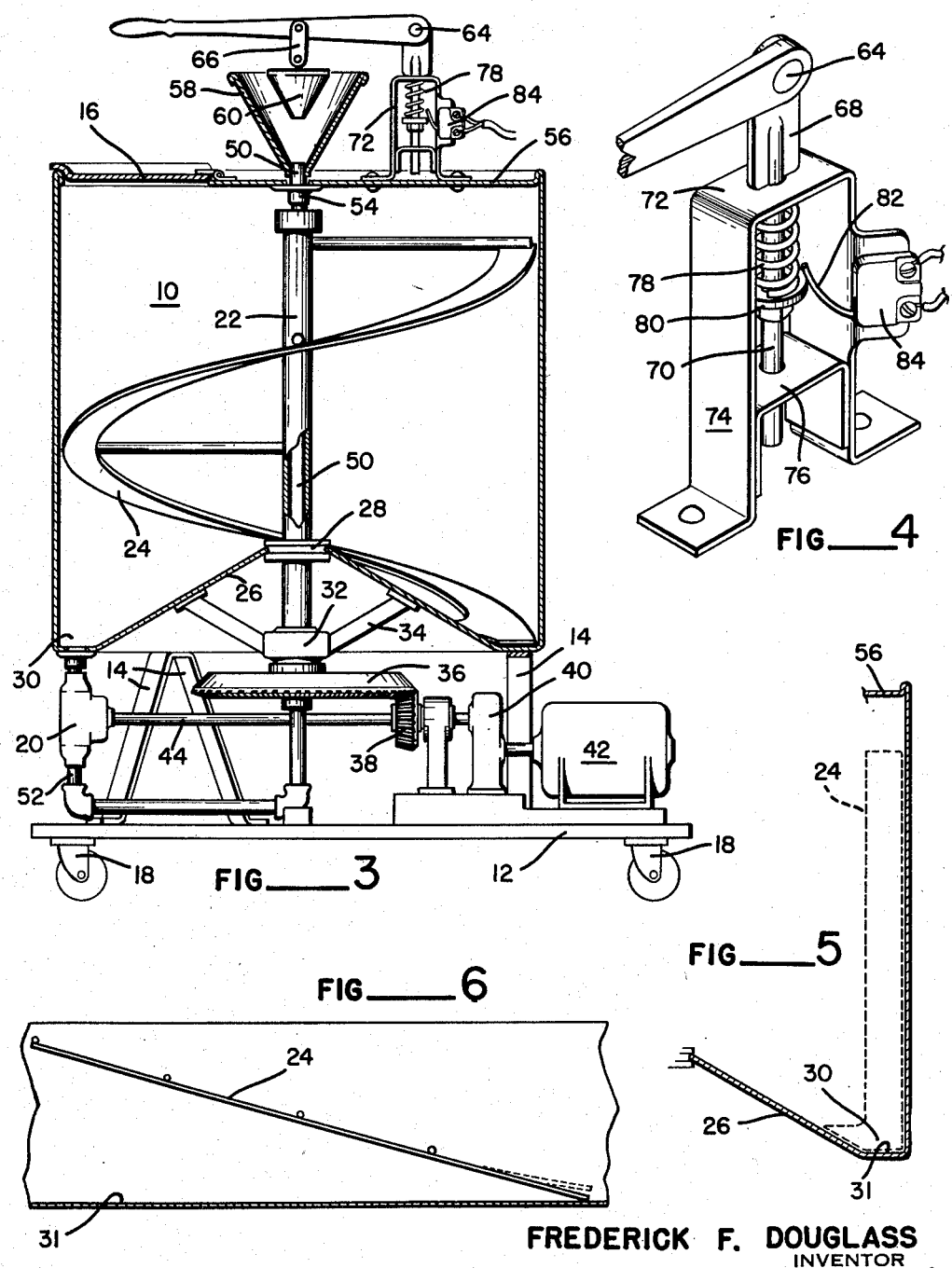

ated Feb. 15, 1955

2,702,092

DEVICE FOR GREASE PACKING ANTIFRICTION BEARINGS

Frederick F. Douglass, Tacoma, Wash.

Application January 5, 1953, Serial No. 329,652

10 Claims. (Cl. 184—1)

This present device consists of a conical bearing receiver, means for holding the bearing in place so as to provide a grease-tight seal within the receiver around the margin of the bearing, and means for pumping grease under pressure through the bearing in order to clean out any foreign material or old grease in the bearing and to leave the bearing in a condition completely grease-packed ready for use. Arrangements are made to insure that grease is fed to the pump and the whole unit is a self-contained, portable device which can be conveniently rolled about for use where it is most convenient. The device is thus free from the necessity of having a source of electric current available and this permits the same to be used at points well away from shops where electric current is normally available. In the past many useful devices have been produced, all having as their object the repacking of antifriction bearings. These devices may be divided generally into hand-operated devices, which of course would have the mobility of my present device, but are very slow in operation and require laborious handling by the user; and the other type of device is generally classifiable as fluid-operated in which air under pressure, or water under pressure, is used as the grease expelling agency. These devices again are dependent upon the availability of such fluids under pressure and that ties the equipment to a source of those fluid pressures. In this present device it is believed that a real need is being served. The self-contained features of this equipment, together with its complete divorcement from fixed sources of energy, enables it to service a field not now properly serviced. It is an excellent solution of the problem of the small shop operator, the fleet operator, and should meet with ready acceptance in the armed services.

The principal object of this invention is to provide a self-contained unit for the packing of antifriction bearings with grease.

A further object of this invention is to provide a self-contained unit in which the grease is fed through the bearings by means of a pressure pump. This permits high pressure to be applied to the bearings so as to fully cleanse the same before leaving them filled with grease.

A further object of this invention is to provide means which will insure an adequate supply of grease at all times to the high pressure pump which forces the grease through the bearings.

A further object of this invention is to provide electric switching means which will sequentially time the application of electric power and start the pump or stop the pump to suit the manner of the operation.

Further objects, advantages and capabilities will be apparent from the description and disclosure in the drawings, or may be comprehended or are inherent in the device.

In the drawings:

Figure 3 is a vertical, sectional view through my bearing packing device illustrating the various essential components thereof;

Figure 4 is a fragmentary perspective view, partly in section, illustrating the means employed for controlling the electric current so as to insure proper timing of the application;

Figure 5 is a fragmentary vertical sectional view through one margin of my grease container and illustrating in dashed lines the area covered by my grease pressure scroll; and Figure 6 is a fragmentary vertical sectional view through the bottom of my grease container illustrating the contact between the grease propelling scroll and the bottom of the grease container.

Figure 1:
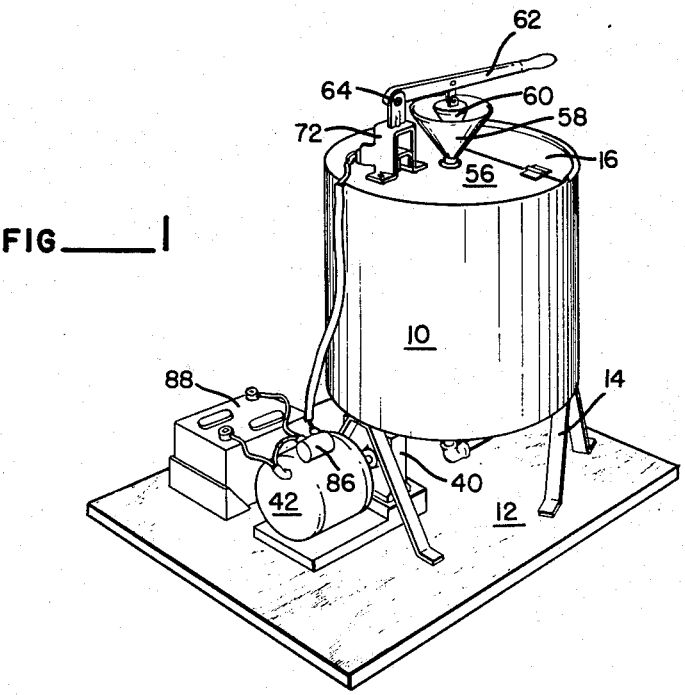
Figure 1 is a perspective view showing one preferred embodiment of my present invention.

Referring more particularly to the disclosure in the drawings, the numeral 10 designates the tank-like reservoir which serves as a container for the grease supply. This container should be of considerable capacity so that my device can be used for reasonable periods without the need of resupplying the grease. Reservoir 10 is preferably raised above its supporting platform 12 as by a plurality of legs 14. This arrangement tends to protect the operating mechanism and to insure its placement in the simplest and most efficient manner. A portion of the top of reservoir 10 is hinged to provide the filling cover 16 so that the partially congealed grease can be easily entered into the reservoir from the large containers in which it is normally supplied. Platform 12 is preferably carried by a plurality of casters as 18 so that the device can easily be moved about, the plan being that this device can be taken to the vehicle which is being reconditioned and reserviced, whether that vehicle is in a garage, or out on a service apron, and this has proven to be a great time saver and is one of the desirable characteristics of this device.

Many different types of greases or lubricants are employed in the packing of antifriction bearings. Some of these are paste-like in consistency and will not flow, consequently it is very necessary to have means that will assure a constant supply of grease to the grease-handling pump indicated in Figure 3 at 20. A relatively simple and convenient means of insuring the proper handling of the lubricants is to provide an axial revolvable shaft as 22 and to suitably secure to this tubular drive shaft the scroll 24. Scroll 24 should be formed after the manner of a helix and have a maximum diameter which will just smoothly revolve within the cylindrical reservoir 10, it being very desirable to move the grease adjacent the shell of the tank, as, due to friction and natural adhesion of the grease to metal, it has been experienced that the greatest tendency for the grease to hang up and bridge over is near the shell of the tank.

Coacting with scroll 24 is an inverted conical bottom portion 26 formed in reservoir 10. The form of this conical bottom is probably best illustrated in Figures 3 and 5 where it will be noted that the bottom has at its apex adjoining member 28 which serves as one of the steadying bearings for the hollow shaft 22. The cone portion does not extend to the peripheral shell of the reservoir but stops somewhat short of the same as will be noted in Figures 3 and 5. This provides a natural channel as 30 so that scroll 24 can, by a wiping action on surface 31, provide a constant supply of grease to the intake of pump 20. The conical bottom provides a very rigid structure and also is used to support a second bearing member for shaft 22 at 32 by means of a plurality of arms 34. Shaft 22 extends downwardly and is fixedly secured to the driven gear 36. Gear 36 is in turn driven by the driving gear 38, through preferably a reduction gear arrangement 40 of the electric motor 42. It will be apparent it is believed that suitable reduction is desirable between the relatively high speed electric motor and the scroll, which is of large diameter, and the speed of the same should be reduced to just a few revolutions per minute. Normally a continuation of the drive shaft upon which gear 34 is mounted will provide a suitable speed for shaft 44 which in turn drives a gear type pump 20.

Axially disposed within reservoir 10 is the vertical grease feed pipe 50. This pipe passes through the hollow shaft 22 and serves as a staying journal for the hollow shaft 22 and the scroll 24 which it supports. The pipe at its lower end, through suitable fittings, communicates with the pump discharge 52. At its upper end pipe 50 is suitably secured by an inverted flange fitting 54 which in turn is secured to the fixed top portion 56 of reservoir 10. Fixedly secured as by welding to the upper exterior end of pipe 50 is the positioning cone 58. This cone preferably has an included angle of approximately 60 degrees and serves as a seat for the bearing B which is to be cleaned and packed. The functioning of this member will be best understood from a study of Figure 2 where it will be noted that the rounded off corner of the outer race of bearing B forms a grease-tight contact with the shell of cone 58.

A seating and sealing cone 60 is provided which is disposed upon the vertical axis of pipe 50 and cone 58 in seated position. Again the functioning of this member will be best observed in Figure 2 in which it will be noted that the cone seats securely and in a grease-tight manner on the rounded off outer margin of the bore of the inner race member. Cone 60 is generally positioned, and pressure applied to it in order to hold it against the grease pressure, by the pivoted lever 62. Lever 62 is pivotably supported by the moving pivot 64 and connection is made between lever 62 and cone 60 by a link 66. This link has the effect of permitting cone 60 to be self centering within the bore of bearing B to form a grease tight seal. To effect this, cone 60 must be a smooth machined surface and of course antifriction bearings themselves have a highly finished surface, usually ground, so that they are exactly concentric. The moving pivot 64 is a means to insure that switching of the current to motor 42 can be sequentially timed with certainty and cannot be effected until full pressure is placed upon cone 60 insuring that it will make its grease-tight seat. This same pressure of course forces bearing B down into cone 58 and insures the seal around the peripheral margin of the bearing. Pivot 64 is formed in part within the vertically slidable member 68. This in effect is a shaft 70 which is suitably deformed on its upper end so as to properly accept the torsional strains that might be imposed upon it by the lever 62. Guide means are provided for the shaft in the upper portion 72 of the housing member 74 and a second guide member is provided at 76. Normally shaft 70 is urged downwardly by the compression spring 78. This spring bears against the under side of member 72 and at its lower end bears upon a thrust collar 80 which is fixedly secured to shaft 70. Collar 80 in turn is disposed so as to operatively engage the trigger 82 of the micro-switch 84. This switch is capable of completing the electrical circuit to the solenoid switch 86 and this switch in turn switches on to the motor the high amperage but low voltage current from a storage battery 88.

*Method of operation*

Figure 2:
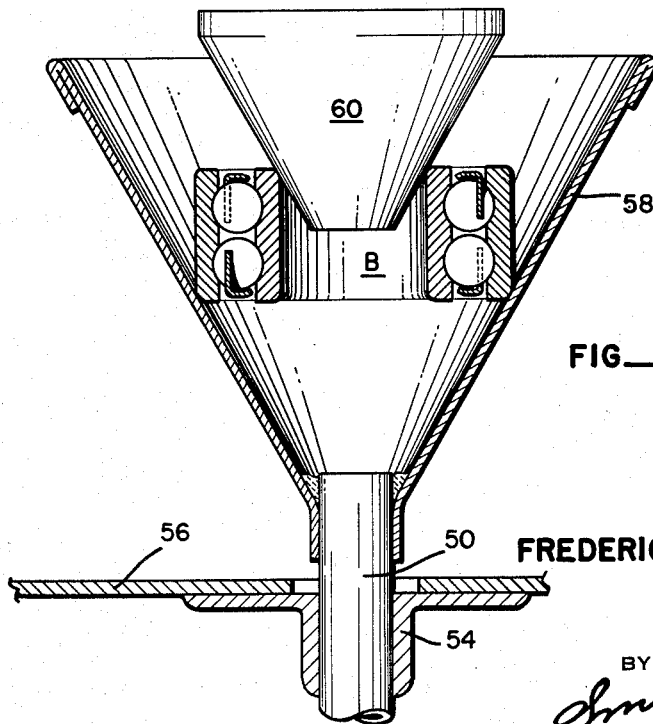
Figure 2 is a vertical sectional view, in fragmentary form, showing a bearing in place in the bearing holder of my device.

In using this device, reservoir 10 is charged with suitable grease through the filling door 16. The storage battery 88 which is fully charged should then be put in place and connected to motor 42. In many operations, however, battery 88 may be left in place and be charged during periods when the device is not used. When a bearing is to be flushed out and repacked, it is inserted as indicated in Figure 2 into the positioning cone 58. Then, by pressing down on lever 62, the operator forces the pressure cone 60 into firm engagement with bearing B and any corrections to insure that bearing B is normal to the axes of cones 58 and 60 may be made.

A continued downward pressure on lever 62 causes the lever to pivot on the fulcrum provided by the connecting link 66. This action raises pivot 64, shaft 70, and flange 80 against spring 78. Finally flange 80 operates trigger 82 of the micro-switch 84 and the solenoid switch 86 is then energized. This switch completes the circuit between motor 42 and battery 88 and the operation is started. One phase of the operation is the driving of pump 20 and the other phase is the revolving of scroll 24. Scroll 24 insures that an adequate supply of grease will at all times be available to pump 20. As the pump is operated, the grease under considerable pressure is forced up through the axially disposed shaft or tube 50 filling the void in cone 58 beneath the bearing. As the pump continues, the grease is forced out through the only avenue of escape which is through the ball cage. As this grease is under considerable pressure the first operation normally is to force out of the bearing all the old grease and any dust, metal particles or the like that it may contain.

When clean grease is observed on the upper face of the bearing throughout its circumference, the operator knows that the bearing has been fully flushed and re-packed with grease. He then releases pressure on lever 62 and spring 78 forces pivot 64 and flange 80 downwardly so the switch 84 no longer completes the circuit. This action stops motor 42 and the flow of grease ceases. The operator can then at his convenience raise lever 62 and remove bearing B with the operation completed.

It is believed that it will be clearly apparent from the above description and the disclosure in the drawings that the invention comprehends a novel construction of a device for grease packing antifriction bearings.

I claim:

1. A device for grease packing antifriction bearings of the type having a positioning cone and a seating and sealing cone positioned to coact with said positioning cone to position a bearing therebetween with the outer race abutting the inner surface of said positioning cone and with said seating and sealing cone pressing against the inner race of the bearing, comprising: a mobile platform and a tank-like reservoir mounted on said platform; an electric motor and a battery and a circuit connecting the same together including a switch disposed to control the operation of the motor; a generally helix shaped scroll mounted in said reservoir to rotate about a vertical axis, the sidewalls of said reservoir being generally symmetrical about the axis of rotation of said scroll and said scroll being disposed to wipe said sidewalls as it rotates; means connecting said scroll to said motor to be driven thereby; the central portion of the bottom of said reservoir sloping downwardly from its center to its periphery and defining an annular channel at the lowermost portion of said bottom and the lower end of said scroll being disposed to wipe along said channel; said positioning cone being positioned on the top of said reservoir and a grease feed pipe leading from said channel and communicating with said positioning cone and a pump interposed in said feed pipe and connected to said motors; a pivot member and guide means for said pivot member positioning said pivot member alongside said positioning cone and permitting vertical movement of said pivot member; a handle having one end portion secured to said pivot member and having the intermediate portion of said handle being connected to said seating and sealing cone to apply pressure thereto in downward movement of said handle; and control means for said switch responsive to movement of said pivot member and arranged to throw said switch to operate said motor when said pivot member is moved upwards as said handle presses said seating and sealing cone downward in securing a bearing in said positioning cone.

2. A device for grease packing antifriction bearings, comprising: a mobile platform and a tank-like reservoir mounted on said platform; an electric motor and a battery and a circuit connecting the same together including a solenoid switch disposed to control the operation of the motor; a vertical shaft in said reservoir and a generally helix shaped scroll mounted on said shaft to rotate therearound, the sidewalls of said reservoir being generally symmetrical about said shaft and said scroll being disposed to wipe said sidewalls as it rotates about said shaft; the central portion of the bottom of said reservoir being generally conical in form and the conical portion stopping short of the sidewalls of said reservoir forming an annular channel at the base of said reservoir and the lower end of said scroll hanging free and disposed to wipe along said channel; a grease feed pipe leading downward from said channel and upward through said vertical shaft to the top of said reservoir and a gear pump interposed in said feed pipe and connected to said motor; means connecting said scroll to said motor to be driven thereby; an inverted positioning cone secured to the top of said reservoir and communicating with the upper end of said feed pipe; a pivot member and guide means for said pivot member positioning said pivot member alongside said positioning cone and permitting limited vertical movement of said pivot member and spring means normally pressing said pivot member to the lowermost position of the pivot member; a handle having one end pivotally secured to said pivot member; an inverted seating and sealing cone and a link pivotally securing said seating and sealing cone to the central portion of said handle, said seating and sealing cone being positioned to coact with said positioning cone to position a bearing therebetween with the outer race between with the outer race of the bearing abutting the inner surface of said positioning cone and with said seating and sealing cone pressing against the inner race of the bearing.

9. A device for grease packing anti-friction bearings of the type having a positioning cone and a seating and sealing cone positioned to coact with said positioning cone to position a bearing therebetween with the outer race of the bearing abutting the inner surface of the said positioning cone and with said seating and sealing cone pressing against the inner race of the bearing, comprising: a tank-like reservoir and a generally helix shaped scroll mounted in said reservoir to rotate about an upright axis, the sidewalls of said reservoir being generally symmetrical about the axis of rotation of said scroll and said scroll being disposed to wipe sidewalls as the scroll rotates; the central portion of the bottom of said reservoir sloping downward from its center to its periphery and defining a ring-shaped channel at the lowermost portion of said bottom and the lower end of said scroll hanging free to wipe along said channel; a feed line running downward from said channel and communicating with said positioning cone and a pump interposed in said feed line; a motor connected to said pump and to said scroll to power the same.

10. A device for grease packing anti-friction bearings of the type having a positioning cone and a seating and sealing cone to coact with said positioning cone to position a bearing therebetween with the outer race of the bearing abutting the inner surface of said positioning cone and with said seating and sealing cone pressing against the inner race of the bearing, comprising: a reservoir and a grease feed pipe leading from said reservoir and communicating with said positioning cone and a pump interposed in said feed line; drive means for operating said pump and a switch controlling said drive means; a handle having one end portion swingably connected to said reservoir and the central portion of said handle being connected to said seating and sealing cone, the handle being manually operable to position said seating and sealing cone to coact with the positioning cone in securing a bearing therebetween by downward movement of the free end of said handle, and control means for said switch connected to said handle operative to initiate said switch to activate said drive means when the free end of said handle is pressed downward past the point where the seating and sealing cone is in full register with such bearing.

References Cited in the file of this patent

UNITED STATES PATENTS

| | | |
|---|---|---|
| 878,279 | Curtis | Feb. 4, 1908 |
| 1,980,984 | Davis | Nov. 20, 1934 |
| 2,209,495 | Scholfield | July 30, 1940 |
| 2,210,478 | Berg | Aug. 6, 1940 |

FOREIGN PATENTS

| | | |
|---|---|---|
| 501,897 | Germany | July 8, 1930 | abutting the inner surface of said positioning cone and with said seating and sealing cone pressing against the inner race of the bearing; a control circuit for said solenoid switch including a micro-switch having a trigger responsive to movement of said pivot member and arranged to activate said solenoid switch to operate said motor when said pivot member is moved upwards as said handle is pressed against said link when said seating and sealing cone is pressed against a bearing in said positioning cone.

3. A device for grease packing antifriction bearings of the type having a positioning cone and a seating and sealing cone positioned to coact with said positioning cone to position a bearing therebetween with the outer race abutting the inner surface of said positioning cone and with said seating and sealing cone pressing against the inner race of the bearing, comprising: a tank-like reservoir; a source of electrical power and an electric motor and a circuit connecting the same together including a switch disposed to control the operation of the motor; a generally helix shaped scroll mounted in said reservoir to rotate about a vertical axis, the sidewalls of said reservoir being generally symmetrical about the axis of rotation of said scroll and said scroll being disposed to wipe said sidewalls as the scroll rotates; means connecting said scroll to said motor to be driven thereby; the bottom of said reservoir having an annular channel in the lowermost portion of the reservoir with the remainder of the bottom sloping downward to said channel and the lower end of said scroll being disposed to wipe along said channel; said positioning cone being positioned on the top of said reservoir and a grease feed pipe leading from said channel and communicating with said positioning cone and a pump interposed in said feed pipe and connected to said motor; a pivot member and guide means for said pivot member permitting vertical movement of said pivot member; a handle having one end portion connected to said pivot member and the intermediate portion of the handle being connected to said seating and sealing cone to apply pressure thereto in downward movement of said handle; and control means for said switch responsive to movement of said pivot member and arranged to throw said switch to operate said motor when said pivot member is moved upwards as said handle presses said seating and sealing cone downward in securing a bearing in said positioning cone.

4. A device for grease packing antifriction bearings of the type having a positioning cone and a seating and sealing cone positioned to coact with said positioning cone to position a bearing therebetween with the outer race abutting the inner surface of said positioning cone and with said seating and sealing cone pressing against the inner race of the bearing, comprising: a reservoir; a source of electrical power and an electric motor and a circuit connecting the same together including a solenoid switch disposed to control the operation of the motor; a grease feed pipe leading from said reservoir and communicating with said positioning cone and a pump interposed in said feed pipe and connected to said motor; a pivot member and guide means for said pivot member positioning said pivot member alongside said positioning cone and permitting limited vertical movement of said pivot member and spring means normally pressing said pivot member to the lowermost position of the pivot member; a handle having one end portion pivotally secured to said pivot member and a link pivotally securing the central portion of said handle to said seating and sealing cone; a control circuit for said solenoid switch including a micro-switch having a trigger responsive to movement of said pivot member and arranged to activate said solenoid switch to operate said motor when said pivot member is moved upwards as said handle is pressed against said link when said seating and sealing cone is pressed against a bearing in said positioning cone.

5. A device for grease packing antifriction bearings of the type having a positioning cone and a seating and sealing cone positioned to coact with said positioning cone to position a bearing therebetween with the outer race abutting the inner surface of said positioning cone and with said seating and sealing cone pressing against the inner race of the bearing, comprising: a reservoir and a grease feed pipe leading from said reservoir and communicating with said positioning cone and a pump interposed in said feed pipe; drive means for operating said pump and a switch controlling said drive means; a pivot member and guide means for said pivot member positioning said pivot member alongside said positioning cone and permitting limited vertical movement of said pivot member; a handle having one end portion connected to said pivot member and the central portion of said handle being connected to said seating and sealing cone to apply pressure thereto in downward movement of said handle; and control means for said switch responsive to movement of said pivot member and arranged to activate said switch to operate said drive means when said pivot member is moved upwards as said handle presses said seating and sealing cone downward against a bearing in said positioning cone.

6. A device for grease packing antifriction bearings of the type having a positioning cone and a seating and sealing cone positioned to coact with said positioning cone to position a bearing therebetween with the outer race of the bearing abutting the inner surface of said positioning cone and with said seating and sealing cone pressing against the inner race of the bearing, comprising: a reservoir and a grease feed pipe leading from said reservoir and communicating with said positioning cone and pressure means for forcing grease from said reservoir through said grease feed pipe into said positioning cone under pressure; drive means for operating said pressure means and a switch controlling said drive means; a pivot member positioned alongside said positioning cone; a handle having one end portion connected to said pivot member and the central portion of said handle being connected to said seating and sealing cone to apply pressure thereto in downward movement of said handle; and control means for said switch connected to said pivot member arranged to operate said switch activating said drive means when said pivot member is biased upwards as said handle presses said seating and sealing cone downward against a bearing in said positioning cone.

7. A device for grease packing anti-friction bearings, comprising: a mobile platform mounted on wheels and a tank-like reservoir mounted on said platform; an electric motor and a battery, mounted on said platform, and a circuit including switch means connecting the motor and battery; a vertical tube and pipe means including a pump connecting the lower end of said tube to the bottom of said reservoir to receive grease from the reservoir and to force the grease upward through said vertical tube and said motor being connected to said pump to operate the same; an inverted positioning cone secured to the top of said reservoir and communicating with said vertical tube to receive grease therefrom; an inverted seating and sealing cone and a handle pivotally connected to said reservoir and the central portion of said handle being connected to said seating and sealing cone positioning the seating and sealing cone to coact with said positioning cone to position a bearing therebetween with the outer race of the bearing abutting the inner surface of said positioning cone and with said seating and sealing cone pressing against the inner race of the bearing.

8. A device for grease packing anti-friction bearings, comprising: a mobile platform mounted on wheels and a tank-like reservoir mounted on said platform; an electric motor and a battery, mounted on said platform, and a circuit including switch means connecting the motor and battery; a vertical shaft rotatably mounted and centered in said reservoir and extending from top to bottom thereof and a feed pipe extending through said vertical shaft and means including a pump connecting the lower end of said pipe to the bottom of said reservoir to receive grease from the reservoir and to force grease upward through said pipe and said motor being connected to said pump to operate the same; and a generally helix shaped scroll supported by said vertical shaft to rotate therewith and the sidewalls of said reservoir being generally symmetrical about the axis of rotation of said scroll and said scroll being disposed to wipe said sidewalls as the scroll rotates; means connecting said scroll to said motor to be driven thereby; an inverted positioning cone positioned at the top of said reservoir and communicating with said pipe to receive grease therefrom; an inverted seating and sealing cone and means operable to position said seating and sealing cone to coact with said positioning cone to position a bearing there-